United States Patent [19]
Magliozzi et al.

[11] Patent Number: 5,148,402
[45] Date of Patent: Sep. 15, 1992

[54] METHOD FOR REDUCING AIRCRAFT CABIN NOISE AND VIBRATION

[75] Inventors: Bernard Magliozzi, West Suffield; Frederick B. Metzger, Simsbury, both of Conn.

[73] Assignee: United Technologies Corporation, Hartford, Conn.

[21] Appl. No.: 633,719

[22] Filed: Dec. 21, 1990

[51] Int. Cl.$^5$ ............... H04R 27/00; B64C 11/50
[52] U.S. Cl. ............... 364/574; 364/424.01; 244/1 N; 416/34
[58] Field of Search ............ 364/574, 424.01, 431.01, 364/508; 416/34, 35; 244/1 N; 381/71

[56] References Cited

U.S. PATENT DOCUMENTS

| | | | |
|---|---|---|---|
| 4,669,058 | 5/1987 | Schneider et al. | 364/148 |
| 4,947,356 | 8/1990 | Elliott et al. | 364/574 |
| 5,027,277 | 6/1991 | Schneider | 364/431.01 |
| 5,093,791 | 3/1992 | Schneider et al. | 364/431.01 |

*Primary Examiner*—Thomas G. Black

[57] ABSTRACT

The rotation of N-bladed propellers of a multi-engine aircraft is controlled by phase angle synchronizer 30 such that a predetermined phase angle offset $\phi 3$ is maintained between the blades of a first propeller 10 and the blades of a second propeller 20, at which offset cabin noise is reduced to a minimum and cabin vibration to a near minimum. The controller 40 determines the optimum phase angle offset $\phi 3$ to be that phase angle of the set of N periodic phase angles: $\phi 1 + K(360/N)$, where K ranges in integer steps from 0 to $N-1$, each characteristic of minimum cabin noise generation, beginning with the minimum first phase angle, $\phi 1$, lying between 0 and $360/N$ degrees, which is closest to the second phase angle, $\phi 2$, characteristic of minimum cabin vibration.

8 Claims, 2 Drawing Sheets

METHOD FOR REDUCING AIRCRAFT CABIN NOISE AND VIBRATION

TECHNICAL FIELD

This invention relates generally to controlling aircraft cabin noise and vibration on multi-engine propeller driven or fan turbine powered aircraft and, more particularly, to a method for synchronizing the propellers or fans of the aircraft by maintaining a certain phase angle offset between the blades of the master propeller/fan and the blades of each slave propeller/fan so as to reduce cabin noise to a minimum level and cabin vibration to a near minimum level.

BACKGROUND ART

It is well known that the asynchronous operation of bladed propulsors, such as propellers and fans, on multi-engine aircraft generates acoustic cabin noise and cabin vibrations which may be annoying to passengers. Each of the propellers or fans creates airflow disturbances and beats as its blades rotate through the air flowing past the propeller or fan. Also, rotor imbalance acts on the propulsor shaft and is transmitted to and excites the aircraft structure. As a result, acoustic noise and vibrations are generated which are felt in the aircraft cabin.

The conventional method of minimizing cabin noise generated by the asynchronous operation of the bladed propulsors on multi-engine aircraft is to maintain a phase angle difference between the bladed propulsors which results in an interaction of the airflow disturbances created by the propulsors so as to at least partially cancel each other thereby reducing to varying degree the noise transmitted to the cabin. Similarly, by proper phase angle selection, interaction may be generated which results in mutual cancellation of the mechanical excitations from the imbalance in the propulsors so as to reduce cabin vibration. Typically, one propulsor is designated as the master propulsor, and the phase angle relationship of the blades of other propulsor or propulsors, termed slave propulsor or propulsors, as the case may be, is fixed relative to the blades of the master propulsor to minimize cabin noise. That is, the blades of each slave propulsor are circumferentially offset from the corresponding blades of the master propulsor by a desired phase angle which has been determined to be that phase angle offset at which the beating noise characteristic of asynchronous operation is minimized.

Unfortunately, minimum cabin noise production and minimum cabin vibration generation are not often experienced at the same phase angle offsets between master and slave propulsors. The production of noise is a function of the frequency of blade passage through the air. Thus, the dominant noise pattern is a harmonic which repeats an integral number of times directly proportional to the number of blades of the propulsor. For a four blade propulsor, the minimum phase angle offset at which minimum noise will be experienced lies between 0 and 90 degrees. However, as vibration generation is a harmonic of the rotational speed of the propulsor, the phase angle offset which produces minimum vibration may lie at any value between 0 and 360 degrees. Therefore, setting the phase angle offset between the blades of the slave propulsor and the blades of the master propulsor at the minimum value for the phase angle offset which produces minimum noise seldom results in the simultaneous reduction of cabin vibration to low levels and may even result in a setting which produces near maximum vibration.

Accordingly, it is an object of the present invention to provide a method for phase angle synchronizing the rotation of a N-bladed slave propeller with the rotation of a N-bladed master propeller of an aircraft so as to reduce both noise and vibration in the passenger cabin of the aircraft.

It is also an object of the present invention to provide such a method wherein the phase angle at blades of the slave propeller from the blades of the master propeller is selected to be that phase angle at which cabin noise generation is at a minimum and cabin vibration is reduced to near minimum levels.

DISCLOSURE OF INVENTION

A method is provided for phase angle synchronization of the rotation of a N-bladed slave propeller with the rotation of a N-bladed master propeller of an aircraft so as to reduce both noise and vibration in the passenger cabin of the aircraft. A first phase angle, $\phi 1$, having a magnitude ranging from 0 to less than $360/N$ degrees, is selected which comprises that phase angle offset between the blades of the slave propeller and the blades of the master propeller which results in minimum cabin noise. A second phase angle, $\phi 2$, having a magnitude ranging from 0 to less than 360 degrees, is selected which comprises that phase angle offset between the blades of the slave propeller and the blades of the master propeller which results in minimum cabin vibration.

After the minimum noise and minimum vibration phase angles, $\phi 1$ and $\phi 2$, respectively, have been selected, a third phase angle, $\phi 3$, is selected from the group of the N phase angles defined by $\phi 1 + K(360/N)$, wherein K ranges in integer steps from 0 to $N-1$, for which the absolute value of the difference between $\phi 3$ and $\phi 2$ is minimized. The phase angle offset between the blades of the slave propeller and the blades of the master propeller is then maintained about equal to the phase angle $\phi 3$ thereby ensuring that minimum cabin noise and near minimum cabin vibration are generated.

BRIEF DESCRIPTION OF DRAWING

These and other objects, features and advantages of the present invention will become more apparent in light of the detailed description of a best mode embodiment thereof, as illustrated in the accompanying drawing wherein.

BEST MODE FOR CARRYING OUT THE INVENTION

The method of present invention for phase angle synchronization of the bladed propulsors on a multi-engine aircraft will be described hereinafter with respect to a twin engine aircraft equipped with either four-bladed or six-bladed propellers. The method of the present invention is, however, also applicable to the fans of prop fan and turbofan turbine engines. Further, the present invention is being illustrated with respect to four and six bladed propellers of a twin engine aircraft solely by way of example, but is also applicable to aircraft having more than two engines and to propellers having any number of blades.

Figure 1:
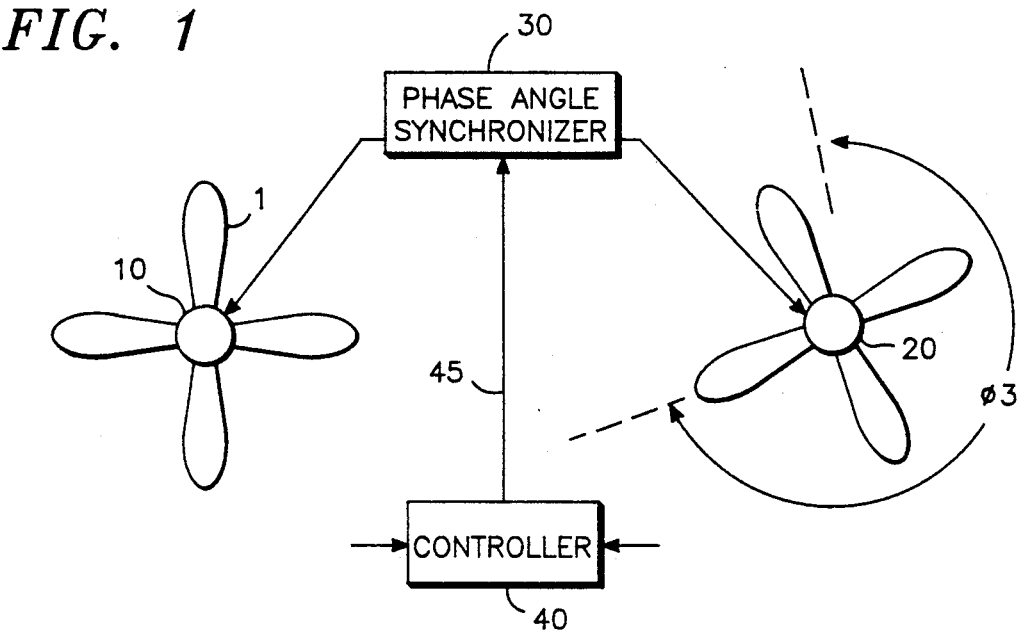
FIG. 1 is an illustration of phase synchronized master and slave four-bladed propellers wherein the slave propeller is offset from the master propeller in accordance with the present invention by a phase angle $\phi 3$.

Referring now to FIG. 1, there is illustrated therein a pair of four-bladed propellers of a twin engine aircraft, the propellers being phase angle synchronized in accordance with the present invention. The port propeller 10 is designated as the master propeller and the starboard propeller 20 is designated as the slave propeller. The blades of the slave propeller 20 are offset by an angle $\phi 3$ in a clockwise direction from the vertical so as to be synchronized with the blades of the master propeller 10 in such a manner as to generate interaction between the airflow disturbances created by the rotation of the blades and between the propeller imbalance excitations thereby reducing both cabin noise and cabin vibration to near minimum levels.

The rotation of the propellers is controlled by the phase angle synchronization means 30 such that blade 1 of the slave propeller 20 is maintained at a predetermined phase angle offset $\phi 3$ from blade 1 of the master propeller 10. The controller 40 operatively associated with the phase angle synchronization means 30 determines the phase angle offset $\phi 3$ based on two input parameters: a phase angle, $\phi 2$, characteristic of minimum cabin noise generation and a second phase angle, $\phi 3$, characteristic of minimum cabin vibration.

The first phase angle, $\phi 1$, is selected to be the phase angle offset between the blades of the slave propeller 20 and blades of the master propeller 10 at which the generated cabin noise is a minimum. The first phase angle, $\phi 1$, will have a magnitude ranging from 0 to less than $360/N$ degrees, where N is the number of propeller blades. As the dominant blade noise characteristic is a harmonic of blade passage frequency, there will be N phase angle offsets between 0 and 360 degrees at which the minimum noise level be experienced. The minimum of these will be the first phase angle, $\phi 1$. The remaining minimum noise phase angle offsets will occur at periodic intervals of $360/N$ degrees from the first phase angle, $\phi 1$. Thus, for an N-bladed propeller system, minimum noise will be experienced whenever the blades of the slave propeller 20 are offset from the blades of the master propeller 10 by an offset selected from the group of N phase angles consisting of $\phi 1$, $\phi 1+(360/N)$, $\phi 1+2(360/N)$, ... and $\phi 1+(N-1)(360/N)$.

The second phase angle, $\phi 2$, is selected to be the phase angle offset between the blades of the slave propeller 20 and blades of the master propeller 10 at which the generated cabin vibration is a minimum. As vibration is related to the harmonics of RPM frequency rather than blade passage frequency, there is only one phase angle offset between 0 and 360 degrees at which the generation of cabin vibration will be at a minimum. This is true for any N-bladed propeller system.

Typically, the minimum noise generation phase angle offset, $\phi 1$, and the minimum vibration generation phase angle offset, $\phi 2$, are determined during flight testing before the aircraft is placed into actual service. To determine the input parameters, $\phi 1$ and $\phi 2$, noise and vibration measuring equipment is mounted in the aircraft cabin. While the aircraft is in flight, the phase angle offset between the slave propeller 20 and the master propeller 10 is varied from 0 to $360/N$ degrees to determine the offset at which the measured cabin noise is a minimum, and also from 0 to 360 degrees to determine the offset at which the vibration measured within the cabin is at a minimum. Of course, after any change in the arrangement of seats and equipment in the aircraft cabin, it would be necessary to rerun at least the in flight vibration tests to determine a new value for the minimum vibration phase angle offset for which the measured cabin vibration is minimized. As vibration generation is highly influenced by propeller imbalance, it is also desirable to rerun the in flight vibration tests whenever a propeller has been replaced or a blade of a propeller eroded, repaired or replaced, to D determine a new value of phase angle offset, $\phi 2$, for minimum cabin vibration generation.

With the predetermined values of $\phi 1$ and $\phi 2$ as input parameters, the controller 40 operatively associated with the phase angle synchronization means 30 determines the phase angle offset $\phi 3$ at which the blades of the slave propeller 20 should be offset from the blades of the master propeller 10 so as to maintain cabin noise at a minimum level and cabin vibration at a near minimum level. To do so, the controller 40 determines which of the group of N periodic phase angles $\phi 1$, $\phi+(360/N)$, $\phi+2(360/N)$ thru $\phi+(N-1)(360/N)$ is the closest to the minimum vibration phase angle offset $\phi 2$. In one method of doing so, the controller 40 sets the phase angle offset as that phase angle $\phi 1+K(360/N)$, wherein K is an integer ranging from 0 to $N-1$ and N is the number of blades per propeller, at which the absolute value of the quantity $\phi 1+K(360/N)-\phi 2$ is a minimum. Having determined the desired phase angle offset $\phi 3$, the controller 40 generates and transmits to the phase angle synchronizer 30 a signal 45 representative of the desired value of the optimum phase angle offset, $\phi 3$. The synchronizer 30 in turn adjusts the speed of the propeller shafts of at least one of the master and slave propellers such that the phase angle offset between the blades of the slave propeller 20 and the blades of the master propeller 10 is adjusted to and maintained within a preselected tolerance, e.g. plus or minus two to four degrees, of the desired phase angle offset $\phi 3$.

Figure 2:
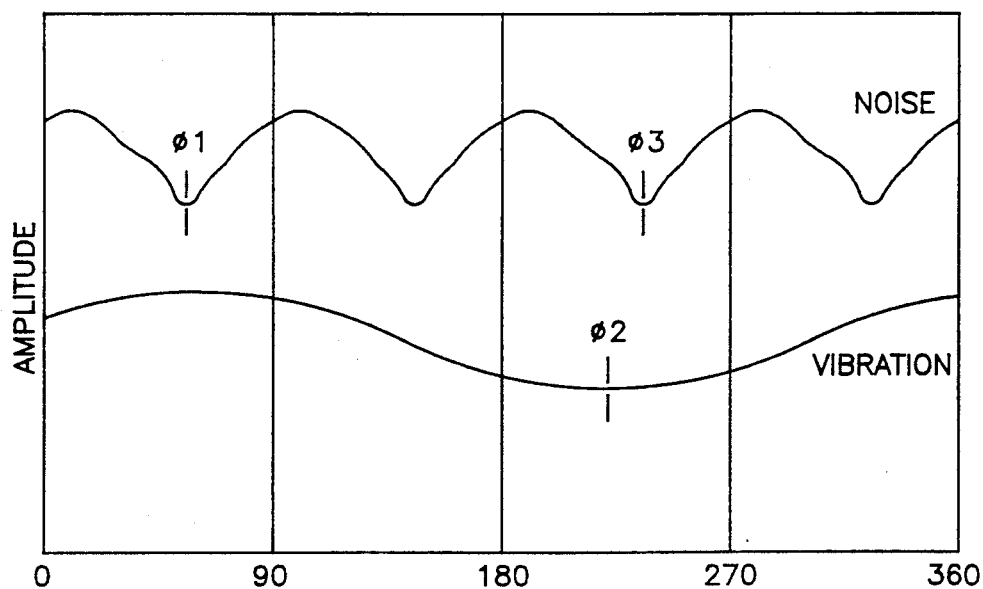
FIG. 2 is a graphical illustration showing the variation of cabin noise and cabin vibration as a function of phase angle offset for the four-bladed propeller system of FIG. 1.

Although the method of the present invention is applicable to propellers having any number of blades, it will be further described herein with respect to four and six-bladed propellers. Referring now specifically to FIGS. 1 and 2, a twin propeller system is illustrated wherein each of the propellers have four blades (N=4), with the blades of the slave propeller 10 being offset from the corresponding blades of the master propeller 20 by a phase angle $\phi 3$ under the command of the phase angle synchronizer 30. As illustrated in FIG. 1, blade 1 of the slave propeller 20 has been offset in a clockwise direction from blade 1 of the master propeller 10 by a phase angle of 235 degrees. The controller 40 has selected the phase angle offset of 235 degrees based on the input phase angles $\phi 1$ and $\phi 2$. As illustrated in the FIG. 2, the value of the phase angle offset $\phi 1$ lying between 0 and 90 degrees (i.e. 360/4) at which the generated cabin noise is a minimum is 55 degrees and the phase angle offset $\phi 2$ at which the generated cabin vibration is 220 degrees. Therefore, the four minimum noise phase angle offsets are 55, 145, 235 and 325 degrees. Of these, the minimum noise phase angle offset of 235 degrees is closest to the minimum vibration phase angle offset of 220 degrees and therefore is selected by the controller 40 as the desired phase angle offset $\phi 3$ at which cabin noise will be at a minimum and cabin vibration at a near minimum.

Figure 3:
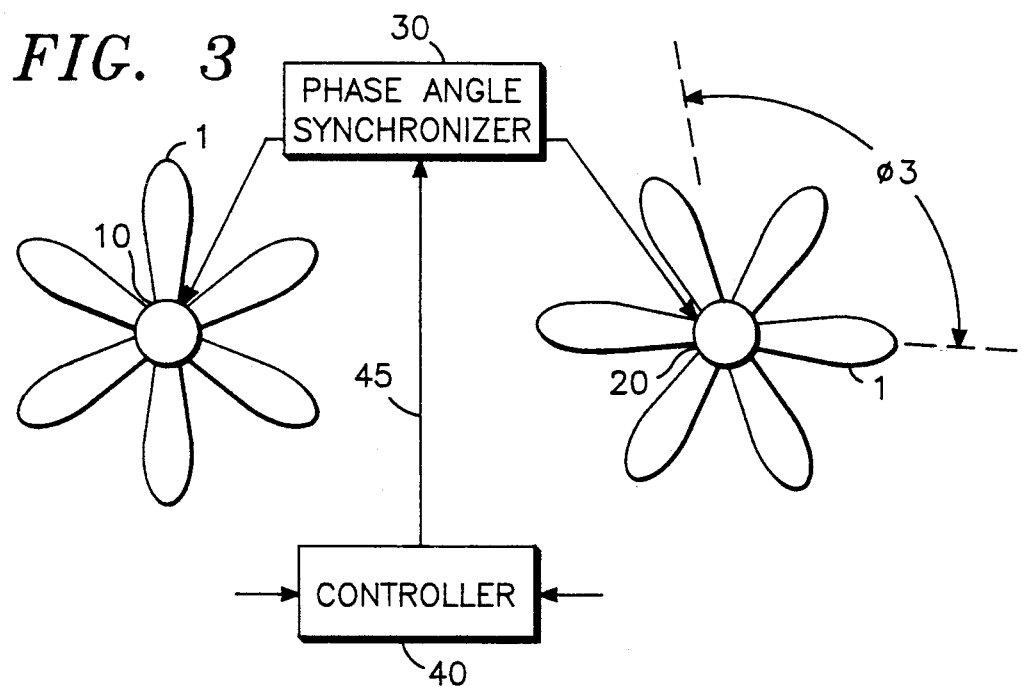
FIG. 3 is an illustration of phase synchronized master and slave six-bladed propellers wherein the slave propeller is offset from the master propeller in accordance with the present invention by a phase angle $\phi 3$.
Figure 4:
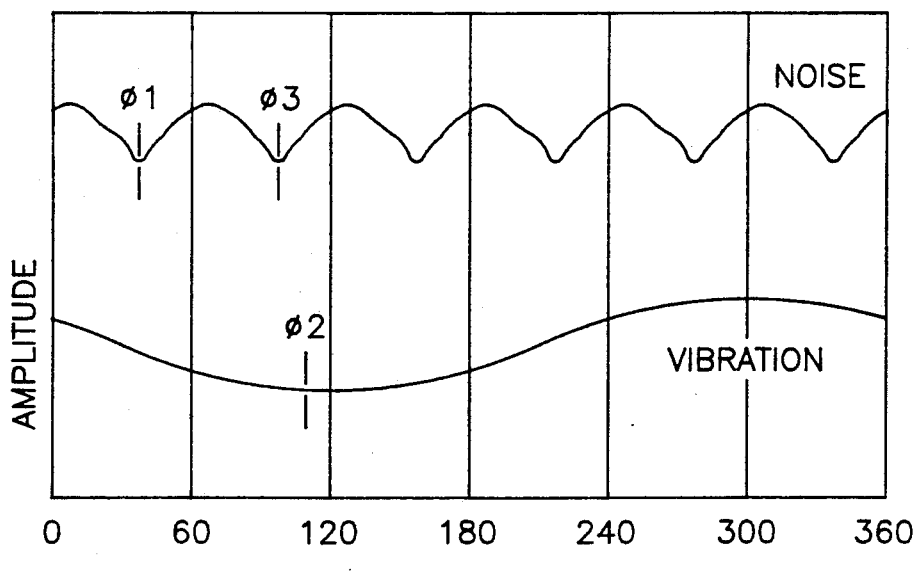
FIG. 4 is a graphical illustration showing the variation of cabin noise and cabin vibration as a function of phase angle offset for the six-bladed propeller system of FIG. 3.

Referring now specifically to FIGS. 3 and 4, a twin propeller system is illustrated wherein each of the propellers have six blades (N=6), with the blades of the slave propeller 10 being offset from the corresponding blades of the master propeller 20 by a phase angle $\phi 3$ under the command of the phase angle synchronizer 30. As illustrated in FIG. 3, blade 1 of the slave propeller 20 has been offset in a clockwise direction from blade 1 of the master propeller 10 by a phase angle of 95 degrees. The controller 40 has selected the phase angle offset of 95 degrees based on the input phase angles $\phi 1$ and $\phi 2$. As illustrated in the FIG. 4, the value of the phase angle offset $\phi 1$ lying between 0 and 60 degrees (i.e. 360/6) at which the generated cabin noise is a minimum is 35 degrees and the phase angle offset $\phi 2$ at which the generated cabin vibration is 110 degrees. Therefore, the six minimum noise offsets are 35, 95, 155, 215, 275 and 335 degrees. Of these, the minimum noise phase angle offset of 95 degrees is closest to the minimum vibration phase angle offset of 110 degrees and therefore is selected by the controller 40 as the desired phase angle offset $\phi 3$ at which cabin noise will be at a minimum and cabin vibration at a near minimum.

The method of the present invention may also be used to phase synchronize the rotation of two or more N-bladed propellers without designating one as a master and the others as slaves. For example, in the case of a plurality of engines, the controller 40 may be utilized as the master. So used, the controller 40 operates on each propeller to maintain the blades of that propeller at a phase angle offset $\phi 3$ from a common reference, which offset is specific to that propeller and represents the optimum phase angle offset determined in accordance the method of the present invention at which cabin noise will be at a minimum and cabin vibration at a near minimum. In such a case, there would be determined for each propeller a minimum noise phase angle offset $\phi 1$, a minimum vibration phase angle offset $\phi 2$, and an optimum phase angle offset $\phi 3$. Thus, for a four propeller aircraft, there would be four sets of offsets $\phi 1$, $\phi 2$, and $\phi 3$, one set for each propeller, which offsets are all measured from a common reference, for example clockwise from the vertical.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method for phase synchronizing the rotation of a first propeller and a second propeller of an aircraft, each of said propellers having N number of blades, so as to reduce both noise and vibration in the passenger cabin of the aircraft, said method comprising:

a. selecting as a first phase angle, $\phi 1$, that phase angle offset between the blades of said first propeller and the blades of said second propeller lying in the range from 0 to less than 360/N degrees at which minimum cabin noise is generated;

b. selecting as a second phase angle, $\phi 2$, that phase angle offset between the blades of said first propeller and the blades of said second propeller lying in the range from 0 to less than 360 degrees at which minimum cabin vibration is generated;

c. determining a third phase angle, $\phi 3$, selected from the group of the N phase angles defined by $\phi 1 + K(360/N)$, wherein K ranges in integer steps from 0 to N−1, for which the absolute value of the difference between $\phi 3$ and $\phi 2$ is minimum; and d. maintaining the phase angle offset between the blades of the first propeller and the blades of the second propeller about equal to the phase angle $\phi 3$.

2. A method as recited in claim 1, further comprising maintaining the phase angle offset between the blades of the first propeller and the blades of the second propeller within a preselected tolerance, plus or minus, of the phase angle $\phi 3$.

3. A method for phase synchronizing the rotation of a first four bladed propeller with the rotation of a second four bladed propeller of an aircraft so as to reduce both noise and vibration in the passenger cabin of the aircraft, said method comprising:

a. selecting a first phase angle, $\phi 1$, having a magnitude ranging from 0 to less than 90 degrees, said first angle selected to be that phase angle offset between the blades of said first propeller and the blades of said second propeller which results in minimum cabin noise;

b. selecting a second phase angle, $\phi 2$, having a magnitude ranging from 0 to less than 360 degrees, said second angle selected to be that phase angle offset between the blades of said first propeller and the blades of said second propeller which results in minimum cabin vibration;

c. determining a third phase angle, $\phi 3$, selected from the group of phase angles consisting of $\phi 1$, $\phi 1 + 90$, $\phi 1 + 180$ and $\phi 1 + 270$ for which the absolute value of the difference between $\phi 3$ and $\phi 2$ is minimum; and d. maintaining the phase angle offset between the blades of the first propeller and the blades of the second propeller about equal to the phase angle $\phi 3$.

4. A method as recited in claim 3, further comprising maintaining the phase angle offset between the blades of the first propeller and the blades of the second propeller within a preselected tolerance, plus or minus, of the phase angle $\phi 3$.

5. A method for phase synchronizing the rotation of a first six bladed propeller with the rotation of a second six bladed propeller of an aircraft so as to reduce both noise and vibration in the passenger cabin of the aircraft, said method comprising:

a. selecting a first phase angle, $\phi 1$, having a magnitude ranging from 0 to less than 60 degrees, said first angle selected to be that phase angle offset between the blades of said first propeller and the blades of said second propeller which results in minimum cabin noise;

b. selecting a second phase angle, $\phi 2$, having a magnitude ranging from 0 to less than 360 degrees, said second angle selected to be that phase angle offset between the blades of said first propeller and the blades of said second propeller which results in minimum cabin vibration;

c. determining a third phase angle, $\phi 3$, selected from the group of phase angles consisting of $\phi 1$, $\phi 1+60$, $\phi 1+120$, $\phi 1+180$, $\phi 1+240$ and $\phi 1+300$ for which the absolute value of the difference between $\phi 3$ and $\phi 2$ is minimum; and d. maintaining the phase angle offset between the blades of the first propeller and the blades of the second propeller about equal to the phase angle $\phi 3$.

6. A method as recited in claim 5, further comprising maintaining the phase angle offset between the blades of the first propeller and the blades of the second propeller within a preselected tolerance, plus or minus, of the phase angle $\phi 3$.

7. A method for phase synchronizing the rotation of a plurality of propellers of an aircraft, each of said propellers having N number of blades, so as to reduce both noise and vibration in the passenger cabin of the aircraft, said method comprising:

a. selecting for each propeller as a first phase angle, $\phi 1$, that particular phase angle offset between the blades of said propeller and a common reference lying in the range from 0 to less than 360/N degrees at which minimum cabin noise is generated;

b. selecting for each propeller as a second phase angle, $\phi 2$, that particular phase angle offset between the blades of said propeller and the common reference lying in the range from 0 to less than 360 degrees at which minimum cabin vibration is generated;

c. determining for each propeller a third phase angle, $\phi 3$, selected from the group of the N phase angles defined by $\phi 1+K(360/N)$, wherein K ranges in integer steps from 0 to $N-1$ and, for which the absolute value of the difference between the phase angle $\phi 3$ and the minimum vibration phase angle offset $\phi 2$ particular to said propeller is minimum; and d. maintaining the phase angle offset between the blades of the each propeller and the common reference about equal to the phase angle $\phi 3$ particular to said propeller.

8. A method as recited in claim 7, further comprising maintaining the phase angle offset between the blades of the each propeller and the common reference within a preselected tolerance, plus or minus, of its particular phase angle $\phi 3$.

* * * * *